Dec. 5, 1933.                G. R. ERICSON                1,938,326

HEADLIGHT FOR TOY VEHICLES

Filed June 2, 1933

INVENTOR
George R. Ericson

Patented Dec. 5, 1933

1,938,326

UNITED STATES PATENT OFFICE 1,938,326

HEADLIGHT FOR TOY VEHICLES

George R. Ericson, St. Louis, Mo.

Application June 2, 1933. Serial No. 673,990

8 Claims. (Cl. 46—46)

This invention relates to improvements in toy vehicles and particularly to improvements in headlight devices for such vehicles.

It is the object of this invention to produce a toy vehicle having an improved headlight construction and battery receptacle of very simple and durable construction which can be produced at minimum cost and still give good service. Further objects of the invention will appear from the following description and accompanying drawing, referring to which:

Figure 1:
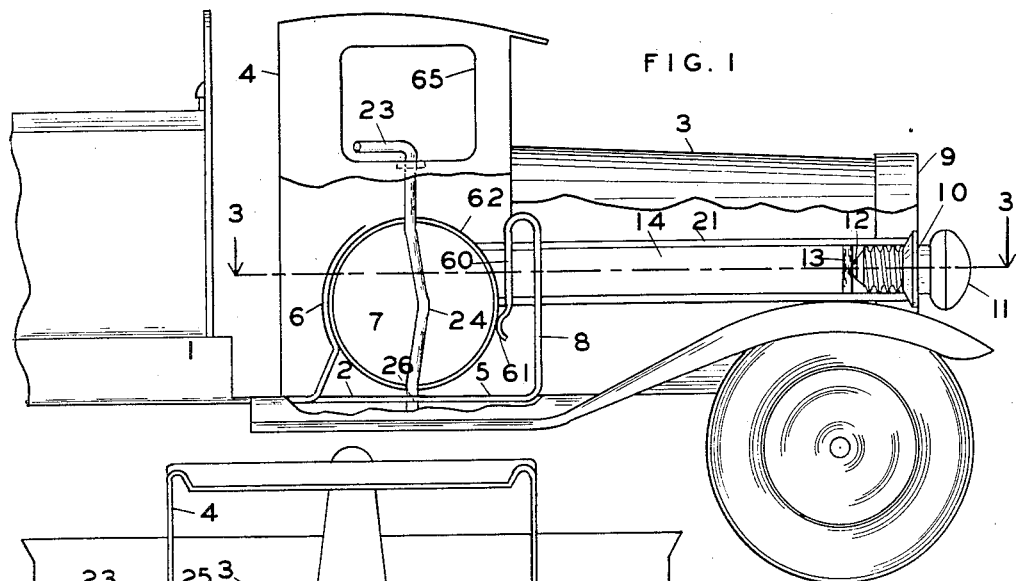
Figure 1 is a side elevation of a toy vehicle having my invention applied thereto and with parts broken away for better illustration of others.
Figure 2:
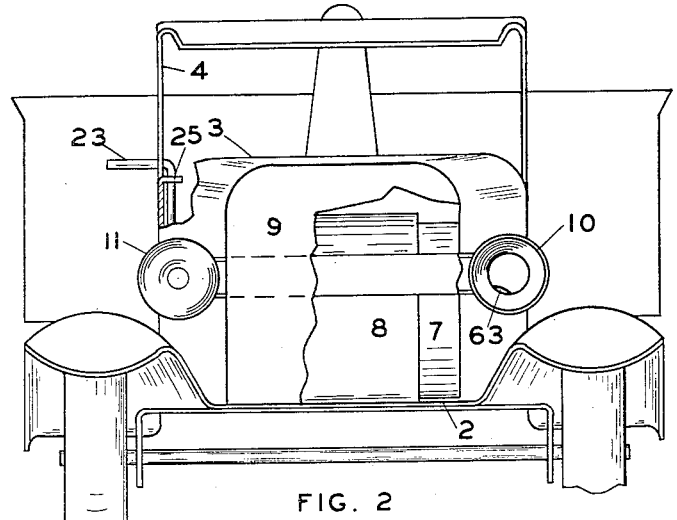
Figure 2 is a front elevation of the truck having parts broken away and one headlight bulb removed.
Figure 3:
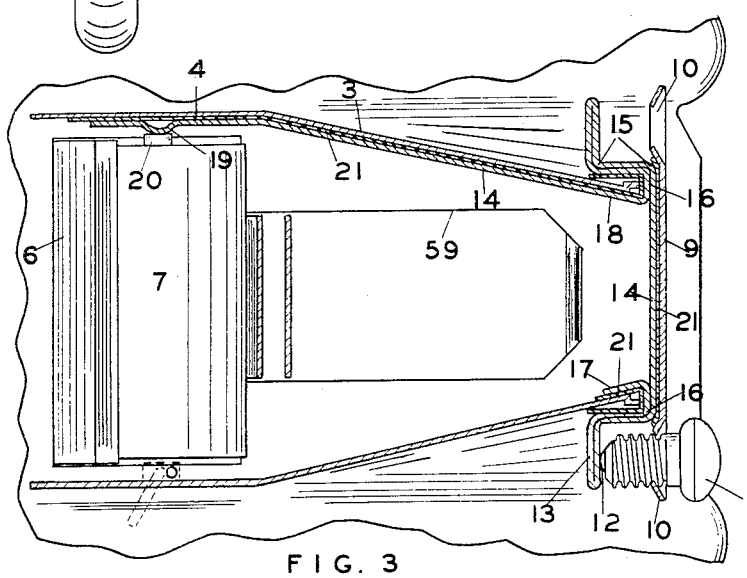
Figure 3 is a horizontal sectional view taken along lines 3—3 of Figure 1 looking in the direction of the arrows, parts being removed for better illustration of others.

The reference numeral 1 indicates the chassis of a truck constructed almost entirely of sheet metal and having a sheet metal floor member 2, a hood 3, and a cab 4. To form a receptacle for the dry cell which operates the battery, an opening 5 is provided in the floor member. This opening is substantially rectangular in shape and of suitable size to conveniently receive a single dry cell 7, which is inserted from the bottom. The metal removed in forming the opening is bent upwardly from the rear edge and partly curved to fit the contour of the battery as indicated at 6. The curved portion of the member 6 extends inwardly below the center line of the battery so as to form a support therefor.

A second opening 59 is formed in the floor of the truck at a point forwardly of the first opening and the metal cut therefrom is bent upwardly from the rear edge of the opening to form a forward resilient battery supporting member 8. The member 8 is first bent upwardly from the rear edge of the opening 59 and then downwardly again at 60, the end of the downwardly bent portion being provided with a curved tip as indicated at 61 for contacting with and supporting the battery. It will be understood that the battery is wrapped with the usual insulating paper 62 so that there is no contact between the sheet metal battery case and the members 6 and 61.

The radiator 9 may, if desired, be formed integral with the hood 3 and is provided with outwardly extending lugs 10, having non-circular openings 63 so formed as to provide a single thread into which the screw threaded base of the headlight bulb 11 may be inserted and held in place thereby. The central terminal 12 of the headlight bulb when screwed in place contacts with the lugs 13 which is formed from a strip of metal or flat wire 14, bent double and at two right angles as shown at 15, the double strip 14 passes thru the opening 16 in the side of the radiator 9 and is insulated from the radiator and hood by the paper strip 21, the strip 14 is also bent back from the inside of the hood 3 as indicated at 17 thereby holding the strip firmly in place. The strip 14 is also similarly bent back from the inside of the hood 3 as at 18 and runs backwardly along the inside of the hood to the side of the cab 4. The strip 14 is bent inwardly at 19 to form a contact for the central terminal 20 of the dry cell 7.

In order to provide a controllable contact of the base of the cell with the frame of the truck, a switch member 22 comprising a bent wire or rod having a handle portion 23 which projects out of the cab window 65 is provided. The switch member is provided with an outwardly bent or eccentric portion 24 and is rotatably mounted or journalled at its upper end in an opening in the inwardly bent flange 25 which is formed integral with the edge of the window 65. The lower end of the switch is rotatably mounted in an opening 26 in the floor of the truck.

In operation in order to close the circuit and light the headlight, the switch is turned to a position in which the eccentric portion 24 contacts with the zinc base of the dry cell 7, thereby completing the electrical circuit thru the lug 25 to the cab and frame of the truck to the screw threaded base of the light bulb. Some sliding movement of the battery is permitted between the switch and the contact member 19 so that if the central terminal of the battery is not already in contact with the member 14 at the point 19, the operation of the switch will move it into contact so that the central terminal of the battery will be electrically connected with the central terminals of the light bulb thru the strip 14 and the lugs 13.

In order to insert or remove the battery 7, it is only necessary to move the switch to the "off" position and push the battery into place or pull it out. If there is any difficulty in gripping the battery from the bottom to pull it out, the fingers can be inserted thru the windows 65 to push the battery downwardly, swinging the member 61 forwardly so that the battery will simply drop out thru the opening 5 in the bottom of the truck.

I claim:

1. In a toy vehicle, a chassis member having a horizontal portion, a cab member mounted on said chassis, a window opening in one side of said cab member, an inturned horizontally extending flange formed integral with said cab member at one edge of said window, an opening in said flange, an opening in said horizontal portion and a bent rod switch member journalled in the openings of said flange and said horizontal members.

2. The invention as claimed in claim 1 and further characterized by the provision of an outwardly extending handle for said switch member, said handle projecting outwardly thru said window opening.

3. In a toy vehicle, a chassis member having a horizontal floor, a substantially rectangular transverse opening in said floor, a flange extending upwardly from one side of said opening, a second opening in said floor forwardly of said first named opening, the metal removed in forming said second opening being bent upwardly and backwardly from the rear edge thereof and forming in conjunction with said first named flange a battery container, said flanges being so related to each other and so shaped as to yieldably retain a battery therebetween by their own resiliency.

4. In a toy vehicle, a sheet metal chassis having a floor, an opening in said floor thru which a battery may be passed, a pair of spaced sheet metal battery retaining members mounted on said floor, said members being adapted to be spread apart by the insertion of a battery therebetween and to yieldably hold it in position with respect to said floor.

5. In a toy vehicle, a sheet metal chassis having a floor, said floor having a battery receiving opening therein, a battery retaining member formed from the metal removed from said opening and extending upwardly from the rear edge thereof, said floor having a second opening formed therein forwardly of the first named opening, the metal from said second opening being bent upwardly and backwardly to form a resilient battery retaining member, said battery retaining members being adapted to be spread apart by the insertion of a dry cell battery therebetween, and to yieldably hold the same in place.

6. In a toy vehicle, a sheet metal chassis having a floor, an opening in said floor through which a battery may be passed, at least a part of the metal removed in forming said opening being turned up from one edge thereof to form a battery retaining member, means forming another battery retaining member at a point spaced from said first mentioned battery retaining member, said retaining members being adapted to be spread apart by the insertion of a battery therebetween and to yieldably hold it in position.

7. In a toy vehicle, a sheet metal chassis having a floor, an opening in said floor, a pair of sheet metal battery retaining members mounted on said floor, said members being adapted to be spread apart by the insertion of a battery therebetween and to yieldably hold it in place with respect to said opening.

8. In a toy vehicle, a sheet metal chassis having a floor, an opening in said floor, a pair of sheet metal battery retaining members formed integrally with said floor, said members being adapted to be spread apart by the insertion of a battery therebetween and to yieldably hold it in position with respect to said floor and said opening.

GEORGE R. ERICSON.